(12) United States Patent
Wu et al.

(10) Patent No.: US 12,398,281 B2
(45) Date of Patent: Aug. 26, 2025

(54) WAXY BUILD MATERIALS FOR THREE-DIMENSIONAL PRINTING APPLICATIONS

(71) Applicants: Bo Wu, Wilsonville, OR (US); John Brookfield, Newberg, OR (US); Jule W Thomas, Jr., West Linn, OR (US)

(72) Inventors: Bo Wu, Wilsonville, OR (US); John Brookfield, Newberg, OR (US); Jule W Thomas, Jr., West Linn, OR (US)

(73) Assignee: 3D Systems, Inc., Rock Hill, SC (US)

( * ) Notice: Subject to any disclaimer, the term of this patent is extended or adjusted under 35 U.S.C. 154(b) by 594 days.

(21) Appl. No.: 17/155,513

(22) Filed: Jan. 22, 2021

(65) Prior Publication Data

US 2021/0230439 A1 Jul. 29, 2021

Related U.S. Application Data

(60) Provisional application No. 62/965,341, filed on Jan. 24, 2020.

(51) Int. Cl.

| | |
|---|---|
| *C09D 11/00* | (2014.01) |
| *B29C 64/124* | (2017.01) |
| *B33Y 10/00* | (2015.01) |
| *B33Y 70/00* | (2020.01) |
| *B33Y 70/10* | (2020.01) |
| *B33Y 80/00* | (2015.01) |
| *C09D 11/08* | (2006.01) |
| *C09D 11/104* | (2014.01) |
| *C09D 11/12* | (2006.01) |
| *C09D 11/30* | (2014.01) |
| *B29K 91/00* | (2006.01) |
| *B29K 267/00* | (2006.01) |

(52) U.S. Cl.
CPC ............ *C09D 11/12* (2013.01); *B29C 64/124* (2017.08); *B33Y 10/00* (2014.12); *B33Y 70/00* (2014.12); *B33Y 70/10* (2020.01); *B33Y 80/00* (2014.12); *C09D 11/08* (2013.01); *C09D 11/104* (2013.01); *C09D 11/30* (2013.01); *B29K 2091/00* (2013.01); *B29K 2093/00* (2013.01); *B29K 2267/00* (2013.01)

(58) Field of Classification Search
CPC ....... C09D 11/12; C09D 11/08; C09D 11/104; C09D 11/30; B33Y 70/00
USPC ......................................................... 106/270
See application file for complete search history.

(56) References Cited

U.S. PATENT DOCUMENTS

| | | | |
|---|---|---|---|
| 2,261,964 A | 11/1941 | Collings | |
| 2007/0119338 A1* | 5/2007 | Breton | C09D 7/48 106/31.75 |
| 2009/0275709 A1 | 11/2009 | Ebert et al. | |
| 2010/0288194 A1 | 11/2010 | Stockwell et al. | |
| 2019/0389139 A1* | 12/2019 | Wu | C09D 11/38 |
| 2025/0019544 A1* | 1/2025 | Wu | C08L 23/06 |

FOREIGN PATENT DOCUMENTS

| | | |
|---|---|---|
| CN | 101899238 A | 12/2010 |
| CN | 105462354 A | 4/2016 |
| CN | 109608892 | 4/2019 |
| JP | 2005-508404 A | 3/2005 |
| JP | 2008-106273 A | 5/2008 |
| JP | 2012-526687 A | 11/2012 |
| JP | 2021-527751 A | 10/2021 |

OTHER PUBLICATIONS

PCT International Search Report for International Search Authority for PCT/US2021/014567 mailed Apr. 21, 2021 (5 pages).
PCT International Written Opinion for International Search Authority for PCT/US2021/014567 mailed Apr. 21, 2021 (5 pages).
English translation of First Examination Report for India Patent Application No. 20221704437, dated Jul. 10, 2023 (5 pages).
English translation of First Office Action for Japanese Patent Application No. 2022-541638, dated Jul. 19, 2023 (4 pages).
English translation of First Office Action for Chinese Patent Application No. 202180010234.1 dated Dec. 6, 2022 (13 pages).
English translation of Second Office Action for Chinese Patent Application No. 202180010234.1 dated Jul. 14, 2023 (8 pages).
Engineering Fundamentals and Training, Jan. 31, 2016, Xuhui et al. Publishing House of Huazhong University of Science and Technology in Wuhan, pp. 200-201.
English translation of Third Office Action for Chinese Patent Application No. 202180010234.1 dated Nov. 20, 2023 (5 pages).
Kohn et al., "Connecting Structure-Property and Structure-Function Relationships across the Disciplines of Chemistry and Biology: Exploring Student Perceptions", CBE—Life Sciences Education, vol. 17, No. 2, ar33, 1-15, 2018.
Dehoff, "Engineering of Microstructures", Materials Research, vol. 2, No. 3, 111-126, 1999.
"Eutectic Point—Explanation, Eutectic System & Eutectic Temperature, Examples & Uses of Eutectic Alloys", 1 page, Accessed Aug. 10, 2023, URL: https://byjus.com/chemistry/eutectic-point/.
"Eutectic system", Wikipedia, 1-7, Accessed Aug. 10, 2023, URL: https://en.wikipedia.org/wiki/Eutectic_system.

(Continued)

*Primary Examiner* — James E McDonough
(74) *Attorney, Agent, or Firm* — Maynard Nexsen PC; John P. Zimmer

(57) ABSTRACT

In one aspect, waxy build material inks are described herein which, in some embodiments, exhibit desirable print quality and associated mechanical properties for three-dimensional printing applications. A build material ink, in some embodiments, comprises 20-40 wt. % rosin component, 5-35 wt. % non-polar wax component, and 40-65 wt. % alcohol wax component comprising one or more waxes of the formula $(C_nH_{2n+1})OH$ wherein n is an integer from 15 to 40. In another aspect, a build material ink comprises a eutectic mixture including rosin component, a non-polar wax component, and an alcohol wax component comprising one or more waxes of the formula $(C_nH_{2n+1})OH$ wherein n is an integer from 15 to 40.

28 Claims, No Drawings

(56) References Cited

OTHER PUBLICATIONS

"Eutectic Definition and Examples", 1-3, Accessed Aug. 10, 2023, URL: https://www.thoughtco.com/eutectic-definition-and-examples-608317.

"Materials science", Wikipedia, 1-18, Accessed Feb. 4, 2022, URL: https://en.wikipedia.org/wiki/Materials_science.

Aguilera et al., "Structure-Property Relationships in Foods", Food Materials Science: Principles and Practice, Chapter 12, 229-253, 2008.

* cited by examiner

WAXY BUILD MATERIALS FOR THREE-DIMENSIONAL PRINTING APPLICATIONS

RELATED APPLICATION DATA

The present application claims priority pursuant to 35 U.S.C. § 119(e) to U.S. Provisional Patent Application Ser. No. 62/965,341 filed Jan. 24, 2020, which is incorporated herein by reference in its entirety.

FIELD

The present invention relates to build materials for three-dimensional printing applications and, in particular, to build materials comprising polar and non-polar wax components.

BACKGROUND

Some commercially available 3D printers or additive manufacturing systems, such as the ProJet® 3D Printers manufactured by 3D Systems of Rock Hill, South Carolina, use inks, including build materials and support materials, that are jetted through heads as liquids to form various 3D objects, articles, or parts. Other 3D printing systems also use an ink that is jetted through a print head or otherwise dispensed onto a substrate. In some instances, the inks are solid at ambient temperatures and convert to liquids at elevated jetting temperatures. Such phase change materials include build materials comprising various wax mixtures. Current wax build materials present several disadvantages in the printing process including high deposition temperatures and high freezing points. High deposition temperatures require additional energy and can discolor and/or destabilize the wax composition leading to unattractive finished articles. Moreover, elevated freezing point of the build wax can inhibit proper fusion between the printed layers, thereby compromising mechanical properties of the finished article.

SUMMARY

In view of these disadvantages, waxy build material inks are described herein which, in some embodiments, exhibit desirable print quality and associated mechanical properties for three-dimensional printing applications. A build material ink, in some embodiments, comprises 20-40 wt. % rosin component, 5-35 wt. % non-polar wax component, and 40-65 wt. % alcohol wax component comprising one or more waxes of the formula $(C_nH_{2n+1})OH$ wherein n is an integer from 15 to 40.

In another aspect, a build material ink comprises a eutectic mixture including a rosin component, a non-polar wax component, and an alcohol wax component comprising one or more waxes of the formula $(C_nH_{2n+1})OH$ wherein n is an integer from 15 to 40.

In a further aspect, methods of printing a three-dimensional article are described herein. A method of printing a three-dimensional article comprises selectively depositing layers of a build material ink in a fluid state onto a substrate. In some embodiments, the build material ink comprises 20-40 wt. % rosin component, 5-35 wt. % non-polar wax component, and 40-65 wt. % alcohol wax component comprising one or more waxes of the formula $(C_nH_{2n+1})OH$ wherein n is an integer from 15 to 40. Alternatively, the build material ink comprises a eutectic mixture including a rosin component, a non-polar wax component, and an alcohol wax component comprising one or more waxes of the formula $(C_nH_{2n+1})OH$ wherein n is an integer from 15 to 40.

These and other embodiments are further described in the following detailed description.

DETAILED DESCRIPTION

Embodiments described herein can be understood more readily by reference to the following detailed description and examples. Elements, apparatus and methods described herein, however, are not limited to the specific embodiments presented in the detailed description and examples. It should be recognized that these embodiments are merely illustrative of the principles of the present disclosure. Numerous modifications and adaptations will be readily apparent to those of skill in the art without departing from the spirit and scope of the disclosure.

In addition, all ranges disclosed herein are to be understood to encompass any and all subranges subsumed therein. For example, a stated range of "1.0 to 10.0" should be considered to include any and all subranges beginning with a minimum value of 1.0 or more and ending with a maximum value of 10.0 or less, e.g., 1.0 to 5.3, or 4.7 to 10.0, or 3.6 to 7.9. Similarly, a stated range of "1 to 10" should be considered to include any and all subranges beginning with a minimum value of 1 or more and ending with a maximum value of 10 or less, e.g., 1 to 5, or 4 to 10, or 3 to 7, or 5 to 8.

All ranges disclosed herein are also to be considered to include the end points of the range, unless expressly stated otherwise. For example, a range of "between 5 and 10," "from 5 to 10," or "5-10" should generally be considered to include the end points 5 and 10.

Further, when the phrase "up to" is used in connection with an amount or quantity, it is to be understood that the amount is at least a detectable amount or quantity. For example, a material present in an amount "up to" a specified amount can be present from a detectable amount and up to and including the specified amount.

The terms "three-dimensional printing system," "three-dimensional printer," "printing," and the like generally describe various solid freeform fabrication techniques for making three-dimensional articles or objects by stereolithography, selective deposition, jetting, fused deposition modeling, multi-jet modeling, and other additive manufacturing techniques now known in the art or that may be known in the future that use a build material or ink to fabricate three-dimensional objects.

I. Build Material Inks

In one aspect, a build material ink comprises 20-40 wt. % rosin component, 5-35 wt. % non-polar wax component, and 40-65 wt. % alcohol wax component comprising one or more waxes of the formula $(C_nH_{2n+1})OH$ wherein n is an integer from 15 to 40.

In another aspect, a build material ink comprises a eutectic mixture including a rosin component, a non-polar wax component, and an alcohol wax component comprising one or more waxes of the formula $(C_nH_{2n+1})OH$ wherein n is an integer from 15 to 40.

Turning now to specific components, the alcohol wax component of a build material ink described herein comprises one or more waxes of the formula $(C_nH_{2n+1})OH$ wherein n is an integer from 15 to 40. In some embodiments, n is an integer from 16 to 22. Waxes having the foregoing formula can be linear or branched. An alcohol wax component, in some embodiments, comprises one or more fatty alcohols. Any fatty alcohol not inconsistent with the objectives of the present disclosure may be used. In some embodiments, for example, a fatty alcohol comprises hexadecanol ($C_{16}H_{33}OH$), octadecanol ($C_{18}H_{37}OH$), eicosanol ($C_{20}H_{41}OH$) or docosanol ($C_{22}H_{45}OH$), or a mixture or combination thereof. Other fatty alcohols may also be used, including fatty alcohols comprising one or more points of unsaturation. Species included in the alcohol wax component can be selected according to several considerations including, but not limited to, desired melting and solidification points of the build material ink as well as desired mechanical properties of build material ink when deposited in a three-dimensional printing application.

Build material inks described herein also comprise a rosin component. Any rosin component not inconsistent with the technical objectives described herein can be employed. In some embodiments, the rosin component comprises a rosin ester, a rosin acid, a rosin alcohol, or various mixtures thereof. In some embodiments, a rosin acid comprises one or more of abietic acid, neoabietic acid, dehydroabietic acid, palustric acid, pimaric acid, isopimaric acid, levopimaric acid, and sandaracopimaric acid. A rosin ester, in some cases, comprises the reaction product of an alcohol with a rosin acid, including a rosin acid described hereinabove. The alcohol, in some instances, can comprise methanol, glycerol, triethylene glycol, and/or pentaerythritol. Further, in some cases, a rosin ester is at least partially hydrogenated. Suitable rosin esters are commercially available from Eastman Chemical of Kingsport, TN under the FORAL™ trade designation. Suitable rosin esters are also commercially available from Arakawa Chemical of Chicago, IL under the KE-trade designation.

A rosin alcohol, in some embodiments, comprises the reaction product of the hydrogenation of one or more rosin acids, including rosin acids described hereinabove. Further, in some cases, a rosin alcohol comprises a primary alcohol, such as hydroabietyl alcohol. Species included in the rosin component can be selected according to several considerations including, but not limited to, desired melting and solidification points of the build material ink as well as desired mechanical properties of build material ink when deposited in a three-dimensional printing application.

Build material inks described herein also comprise a non-polar wax component in addition to the rosin component and alcohol wax component. The non-polar wax component can comprise any non-polar hydrocarbon wax not inconsistent with the technical objectives described herein. Species included in the non-polar wax component can be selected according to several considerations including, but not limited to, desired melting and solidification points of the build material ink as well as desired mechanical properties of build material ink when deposited in a three-dimensional printing application.

In some embodiments, the non-polar wax component comprises paraffin wax, polyolefin wax, or mixtures thereof. Polyolefin wax can comprise polyethylene wax, polypropylene wax, or mixtures thereof, in some embodiments. Polyolefin waxes can be linear, branched, or mixtures of linear and branched species. Suitable non-polar wax compositions are commercially available from 3D Systems of Rock Hill, SC under the Visijet® Icast trade designation.

As described herein, build material inks comprising the alcohol wax component, rosin component, and non-polar wax component can exhibit various desirable properties for three-dimensions printing applications. In some embodiments, for example, a build material ink described herein has an end melting point of 65-71° C. An end melting point in this range is lower than several presently available wax build material inks and can facilitate three-dimensional printing operations by lowering ink deposition temperatures. Lower deposition temperatures can promote build material stability and reduce degradative pathways, including ink oxidation and viscosity instability. Lower deposition temperatures can also reduce energy costs.

Moreover, the build material in may also exhibit an onset freezing point of 48-56° C. Without being bound by any theory, it is believed that lower onset freezing temperatures result in better layer-to-layer and raster-to-raster adhesion, as the jetted dots of build material remain in the liquid or semi-liquid state during the printing process. Adhesion and/or fusion is conceptually enhanced between liquid-to-liquid dots in comparison to solid-to-solid dots, resulting in desirable mechanical properties of the printed articles. While not required in all embodiments, the reductions in end melting point and onset freezing point temperatures may be attributed to the eutectic nature of the build material inks described herein.

In some embodiments, build material inks described herein further comprise one or more stabilizing agents. A stabilizing agent, in some embodiments, comprises one or more anti-oxidants. A stabilizing agent can comprise any anti-oxidant not inconsistent with the objectives of the present disclosure. In some cases, suitable anti-oxidants include various aryl compounds, including butylated hydroxytoluene (BHT).

In some embodiments, a build material ink described herein, when printed, exhibits flexural strength of at least 3 MPa. A printed build material ink, for example, has flexural strength of 4-8 MPa. Additionally, a build material ink described herein, when printed, can exhibit flexural strain of at least 2 percent or at least 3 percent. In some embodiments, a printed build material ink exhibits flexural strain from 2-5 percent. Notably, the foregoing flexural properties are consistent with build wax test bars obtained by injection molding for invest casting applications and indicate enhanced bonding between individual layers of the printed article achieved by build materials described herein.

The build material inks can also exhibit desirable viscosity and viscosity stability at printing or deposition temperatures. In some embodiments, build material inks described herein have viscosity of 10-14 centipoise (cps) or 11-13 cps at 85° C. Additionally, the build material inks can maintain viscosity in these ranges for at least 10 or 20 days at 85° C.

II. Methods of Printing a Three-Dimensional Article

In another aspect, methods of printing a three-dimensional article are described herein. A method of printing a three-dimensional article comprises selectively depositing layers of a build material ink in a fluid state onto a substrate. The build material ink can have any composition and/or properties described in Section I hereinabove. In some embodiments, for example, the build material ink comprises 20-40 wt. % rosin component, 5-35 wt. % non-polar wax component, and 40-65 wt. % alcohol wax component comprising one or more waxes of the formula ($C_nH_{2n+1}$)OH wherein n is an integer from 15 to 40. Alternatively, the build material ink comprises a eutectic mixture including rosin component, a non-polar wax component, and an alcohol wax component comprising one or more waxes of the formula $(C_nH_{2n+1})OH$ wherein n is an integer from 15 to 40.

In some embodiments, a method described herein further comprises depositing one or more layers of support material ink, curing the deposited layer of the support material ink, and depositing the build material ink on the cured support material ink. In such embodiments, the method may also comprise separating the build material of the printed article from the support material by dissolving the support material in water.

In some instances, the support material ink described herein and a build material ink are selectively deposited in a fluid state onto a substrate, such as a build pad of a 3D printing system. Selective deposition may include, for example, depositing the inks according to preselected CAD parameters. For example, in some embodiments, a CAD file drawing corresponding to a desired 3D article to be printed is generated and sliced into a sufficient number of horizontal slices. Then, the support and/or build inks are selectively deposited, layer by layer, according to the horizontal slices of the CAD file drawing to print the desired 3D article. A "sufficient" number of horizontal slices is the number necessary for successful printing of the desired 3D article, e.g., to produce it accurately and precisely.

Further, in some embodiments, a preselected amount of support material ink and/or build material ink described herein are heated to the appropriate temperature and jetted through a print head or a plurality of print heads of a suitable inkjet printer to form a layer on a print pad in a print chamber. In some cases, each layer of ink is deposited according to preselected CAD parameters. A suitable print head to deposit the ink, in some embodiments, is a piezoelectric print head. Additional suitable print heads for the deposition of ink and support material described herein are commercially available from a variety of ink jet printing apparatus manufacturers. For example, Xerox, Hewlett Packard, or Ricoh print heads may be used in some instances.

The support material employed in methods described herein can comprise any support material exhibiting compatibility with the build material ink described in Section I hereinabove. In some embodiments, for example, suitable support materials do no separate from the printed build material ink. Suitable support materials may be water soluble, in some embodiments. Water soluble support materials can facilitate post-print processing operations wherein the support material is removed be exposure to water. As build material inks described herein are not water soluble, exposure to water to remove the support material does not weaken or compromise the integrity and/or mechanical properties of the printed article. This is a marked improvement over prior post-print processing where isopropyl alcohol or other solvents are used to remove the support material. Such solvents can compromise mechanical properties of the printed article.

A support material ink, for example, can include a urethane wax comprising a reaction product between monofunctional polyethylene oxide and polyisocyanate. The support material ink, in some embodiments, further comprises monomeric curable material, oligomeric curable material, or mixtures thereof. In some embodiments, for example, monomeric curable material and/or oligomeric curable material may comprise species including one or more polar moieties or hydrophilic moieties for achieving desired water solubility characteristics of the cured support material ink. Cured support material ink can generally exhibit water solubility of at least 5 g in 100 g water at 35° C., in some embodiments.

These and other embodiments are further illustrated in the following non-limiting examples.

Example 1—Build Material Inks

Build material inks having the compositional parameters in Table I were prepared.

TABLE I

| Build Material Inks (components in wt. %) | | | | | |
|---|---|---|---|---|---|
| Ink ID | A | B | C | D | Comparative |
| Alcohol wax | 57.9 | 54.7 | 51.4 | 45.0 | — |
| Rosin Ester | 32.1 | 30.3 | 28.6 | 25.0 | — |
| Non-polar wax | 10 | 15 | 20 | 30 | 100 |

The alcohol wax employed in the build material inks of Table 1 was stearyl alcohol while the rosin ester was FORAL®85 from Eastman Chemical. The non-polar wax component was VISIJET® M2 ICast printing material from 3D Systems.

Each of the build material inks (A-D) of the present disclosure exhibited eutectic behavior and displayed the end melting point and onset freezing point temperatures provided in Table 2.

TABLE 2

| Build Material Ink Thermal Properties | | |
|---|---|---|
| Ink ID | End MP (° C.) | Onset FP (° C.) |
| A | 66.6 | 49.1 |
| C | 67.6 | 52.1 |
| D | 70.1 | 55.3 |
| Comparative | 83.0 | 61.0 |

As provided in Table 2, build material inks described herein have reduced end melting point and reduced onset freezing point temperatures relative to the Comparative build material ink. Such temperature reductions can enhance bonding between layers of the printed article, thereby enhancing mechanical properties of the printed article. Table 3, for example, provides flexural properties of test bars printed with the build material inks. Test bars were printed in multiple orientations. The flexural data provided in Table 3 corresponds to the weakest printing orientation and, therefore, minimum flexural stress and strain values for the build material ink compositions.

TABLE 3

| Printed Build Material Ink Flexural Properties | | |
|---|---|---|
| Ink ID | Flexural Strength (MPa) | Flexural Strain (%) |
| A | 7.4 | 3.4 |
| B | 6.3 | 3.3 |
| C | 5 | 3.8 |
| Comparative | 1.7 | 0.5 |

As provided in Table 3, the printed build material inks of the present disclosure exhibit significant increases in flexural properties relative to the Comparative build material ink. The flexural properties of Inks A and B are in the range of build wax bars obtained by injection molding for invest casting applications, further demonstrating the advantageous mechanical properties offered by build material inks described herein.

Various embodiments of the invention have been described in fulfillment of the various objectives of the invention. It should be recognized that these embodiments are merely illustrative of the principles of the present invention. Numerous modifications and adaptations thereof will be readily apparent to those skilled in the art without departing from the spirit and scope of the invention.

The invention claimed is:

1. A build material ink for use in three-dimensional printing comprising:
   40-65 wt. % alcohol wax component comprising one or more waxes of the formula $(C_nH_{2n+1})OH$ wherein n is an integer from 15 to 40;
   20-40 wt. % rosin component; and
   5-35 wt. % non-polar wax component,
   wherein the build material ink is a eutectic composition.

2. The build material ink of claim 1, wherein n is an integer from 16 to 22.

3. The build material ink of claim 1, wherein the rosin component comprises an ester of a hydrogenated rosin.

4. The build material ink of claim 1, wherein the non-polar wax component comprises a mixture of non-polar waxes.

5. The build material ink of claim 1, wherein the non-polar wax component comprises paraffin-based wax.

6. The build material ink of claim 1, wherein the non-polar wax component comprises polyolefin wax.

7. The build material ink of claim 6, wherein the polyolefin wax comprises polyethylene wax, polypropylene wax, or mixtures thereof.

8. The build material ink of claim 1 having an end melting point of 65-71° C.

9. The build material ink of claim 8 having an onset freezing point of 48-56° C.

10. The build material ink of claim 1 having a printed flexural strength of at least 3 MPa.

11. The build material ink of claim 10, wherein the printed flexural strength is from 4 to 8 MPa.

12. The build material ink of claim 10 having a printed flexural strain of at least 2 percent.

13. A build material ink comprising:
   a eutectic mixture including a rosin component, a non-polar wax component, and an alcohol wax component comprising one or more waxes of the formula $(C_nH_{2n+1})OH$ wherein n is an integer from 15 to 40.

14. The build material ink of claim 13, wherein n is 16 to 22.

15. The build material ink of claim 13, wherein the rosin component comprises an ester of a hydrogenated rosin.

16. The build material ink of claim 13, wherein the non-polar wax component comprises a mixture of non-polar waxes.

17. The build material ink of claim 13, wherein the non-polar wax component comprises paraffin-based wax.

18. The build material ink of claim 13, wherein the non-polar wax component comprises polyolefin wax.

19. The build material ink of claim 18, wherein the polyolefin wax comprises polyethylene wax, polypropylene wax, or mixtures thereof.

20. The build material ink of claim 13 having an end melting point of 65-71° C.

21. The build material ink of claim 13 having an onset freezing point of 48-56° C.

22. The build material ink of claim 13 having a printed flexural strength of at least 3 MPa.

23. The build material ink of claim 22, wherein the printed flexural strength is from 4 to 8 MPa.

24. The build material ink of claim 22 having a printed flexural strain of at least 3 percent.

25. A method of printing a three-dimensional article comprising:
   selectively depositing layers of an build material ink in a fluid state onto a substrate, wherein the build material ink comprises the ink of claim 1.

26. The method of claim 25 further comprising depositing one or more layers of support material ink, curing the deposited layer of the support material ink, and depositing the build material ink on the cured support material ink.

27. The method of claim 26 further comprising separating the build material of the printed article from the support material by dissolving the support material in water.

28. The build material ink of claim 1, wherein:
   n is an integer from 16 to 22;
   the rosin component comprises an ester of a hydrogenated rosin;
   the non-polar wax component comprises polyolefin wax;
   the build material ink has an end melting point of 65-71° C.;
   the build material ink has an onset freezing point of 48-56° C.; and
   the build material ink has a printed flexural strength from 4 to 8 MPa.

* * * * *